US006425763B1

(12) United States Patent
Pomares

(10) Patent No.: US 6,425,763 B1
(45) Date of Patent: Jul. 30, 2002

(54) GENERATOR OF OBJECTIVE NOMENCLATURE FOR COLORS

(76) Inventor: Jaime Santana Pomares, Pablo Iglesias,15, E-03004 Alicante (ES)

( * ) Notice: Subject to any disclaimer, the term of this patent is extended or adjusted under 35 U.S.C. 154(b) by 0 days.

(21) Appl. No.: 09/762,528

(22) PCT Filed: Aug. 5, 1999

(86) PCT No.: PCT/ES99/00256

§ 371 (c)(1),
(2), (4) Date: Feb. 7, 2001

(87) PCT Pub. No.: WO00/08427

PCT Pub. Date: Feb. 17, 2000

(30) Foreign Application Priority Data

Aug. 7, 1998 (ES) .............................................. 9801759

(51) Int. Cl.[7] ................................................ G09B 19/00
(52) U.S. Cl. ........................................................ 434/98
(58) Field of Search .......................... 434/98, 101, 103, 434/104; 356/421, 422, 423

(56) References Cited

U.S. PATENT DOCUMENTS 1,612,791 A * 1/1927 Ames et al. .................. 434/98
4,241,520 A 12/1980 Norton
4,966,461 A 10/1990 Hooper
4,992,050 A * 2/1991 Edwards ...................... 434/98
4,998,882 A * 3/1991 Glover ........................ 434/98

FOREIGN PATENT DOCUMENTS

FR 2415849 8/1979
FR 2745408 12/1980
GB 2296102 A 6/1996

* cited by examiner

*Primary Examiner*—Kien T. Nguyen
(74) *Attorney, Agent, or Firm*—Townsend and Townsend and Crew LLP

(57) ABSTRACT

An objective color nomenclature is disclosed. The objective color nomenclature comprises one or more substrates of flexible material, each being associated with a color. Each substrate has a grid with a plurality of rows and columns. The first column displays a range of tones of the associated color, with each row of the column containing a particular tone. The corresponding row of additional columns contains the relative amounts of selected primary colors which comprise components of the particular tone, the percentages of primary and supplementary colors comprising the tone, and brightness information based on a selected brightness scale. The corresponding row of another column contains a unique identifier for the color, which in the current system is comprised of 361 parts, ranging from 0 to 360, representing the 360 degrees of a circle.

12 Claims, 3 Drawing Sheets

| A | C | M | GRADO | SANT |
|---|---|---|---|---|
| 100 | 100 | 100 | 184 | 0.00 |
| 99.67 | 100 | 95 | 184 | 0.66 |
| 99.33 | 100 | 90 | 184 | 1.31 |
| 99.00 | 100 | 85 | 184 | 1.97 |
| 98.67 | 100 | 80 | 184 | 2.63 |
| 98.33 | 100 | 75 | 184 | 3.29 |
| 98.00 | 100 | 70 | 184 | 3.94 |
| 97.67 | 100 | 65 | 184 | 4.60 |
| 97.33 | 100 | 60 | 184 | 5.26 |
| 97.00 | 100 | 55 | 184 | 5.91 |
| 96.67 | 100 | 50 | 184 | 6.57 |
| 96.33 | 100 | 45 | 184 | 7.23 |
| 96.00 | 100 | 40 | 184 | 7.88 |
| 95.66 | 100 | 35 | 184 | 8.54 |
| 95.33 | 100 | 30 | 184 | 9.20 |
| 95.00 | 100 | 25 | 184 | 9.86 |
| 94.66 | 100 | 20 | 184 | 10.51 |
| 94.33 | 100 | 15 | 184 | 11.17 |
| 94.00 | 100 | 10 | 184 | 11.83 |
| 93.66 | 100 | 5 | 184 | 12.48 |
| 93.33 | 100 | 0 | 184 | 13.14 |
| 88.66 | 95 | 5 | 184 | 13.58 |
| 84.00 | 90 | 10 | 184 | 14.03 |
| 79.33 | 85 | 15 | 184 | 14.47 |
| 74.66 | 80 | 20 | 184 | 14.91 |
| 70.00 | 75 | 25 | 184 | 15.36 |
| 65.33 | 70 | 30 | 184 | 15.80 |
| 60.66 | 65 | 35 | 184 | 16.24 |
| 56.00 | 60 | 40 | 184 | 16.68 |
| 51.33 | 55 | 45 | 184 | 17.13 |
| 46.67 | 50 | 50 | 184 | 17.57 |
| 42.00 | 45 | 55 | 184 | 18.01 |
| 37.33 | 40 | 60 | 184 | 18.46 |
| 32.67 | 35 | 65 | 184 | 18.90 |
| 28.00 | 30 | 70 | 184 | 19.34 |
| 23.33 | 25 | 75 | 184 | 19.79 |
| 18.67 | 20 | 80 | 184 | 20.23 |
| 14.00 | 15 | 85 | 184 | 20.67 |
| 9.33 | 10 | 90 | 184 | 21.11 |
| 4.67 | 5 | 95 | 184 | 21.56 |
| 0.00 | 0 | 100 | 184 | 22.00 |

GENERATOR OF OBJECTIVE NOMENCLATURE FOR COLORS

PURPOSE OF THE INVENTION

This written description refers to a request for a Patent of Invention for a generator of nomenclature for colors, which is to be used so that a color may be uniquely identified by a number that completely defines it.

The number or degree used as the defining reference for the color, and which also represents its components, is accompanied by a second number that indicates the degree of darkness or lightness of the color relative to black or white, respectively.

The invention makes it possible to catalog all colors usually found in nature and provides easy access to the nomenclature that defines them through the use of cards that contain all of the information needed to ensure that a color may be reproduced under any circumstances.

FIELD OF THE INVENTION

The invention is to be used in the manufacturing industry for graphic arts materials and equipment, and may also be used in the industry devoted to the manufacture of tools, materials and auxiliary devices for colorimetry and its codified communication system based on the 0 to 360 degrees that represent a full circle.

BACKGROUND OF THE INVENTION

The applicant is aware of the existence of color generators based on the reproduction on cards of a limited range of similar colors which are accompanied by an identifying number, in general use.

While the association of each color with a more or less randomly chosen number creates a relation between them and therefore permits the reproduction of the color, serious problems arise if it is necessary to know the number associated with any particular mixture of colors, with the user having to be very familiar with color generators of this type.

The applicant is aware of the existence of a system that makes it possible to generate from various mathematical operations a number which is uniquely associated with each color, and of the existence of a second number that provides information regarding the lightness of the color relative to white or the darkness relative to black, that is, information on the tone of the color.

In this way, each color can be expressed as the sum of a particular number of units of two of the three primary colors, with the number or degree of 120 being assigned to yellow, the number 0 or degree of 360 to magenta, and the number 60 or the degree of 240 to cyan; and, using sixtieths of a degree, any color can be represented by a number between 0 to 360 degrees, produced by the addition of a determined amount of the primary colors mentioned above.

The operations resemble the sum of coordinates that cross at one point and whose module or vector indicates the relative quantity of units of each color, so that the result of the sum of any quantity of the two primary colors will always be a number limited either above or below by the numbers representing the primary colors that are used in the mixture.

In addition, the proportion of the supplementary color provides a number that is related to the lightness of the color. This falls between 0 and 22, with black representing a darkness of 100%, and which for better understanding we shall refer to as a TANS unit; and white representing a lightness of 100%, which we shall call the SANT unit. Both units are newly created.

It would be desirable to have an extensive graphic display of the infinite colors that could be generated, as well as the associated identifying number of the color and the number that indicates its tone. It would also be desirable if this same display could reflect the relative quantities of the primary colors used in the mixture.

DESCRIPTION OF THE INVENTION

The generator of objective nomenclature for colors that is the subject of this description is clearly a new item within its field of use, because it is a mechanism that makes it possible to rapidly locate a color, the numbers associated with the color, the tone and the proportion of the two primary colors of which it is composed.

More specifically, the invention is composed of a number of rectangular cards bearing vertical and horizontal lines which produce a large number of rows and columns.

Each of the rectangular cards represents one color, thus having the same identifying number and differing in the proportion of each of the primary colors contained in the particular color, creating a second identifying number that is transcribed in rows on the invention along with the numbers representing the proportion of the primary colors of which the color is composed, and which are also transcribed in rows.

At the right end of each of the rows mentioned above there is a graphical display of the color.

The cards thus created are held together by whatever device is usually used for this purpose.

DESCRIPTION OF THE DRAWINGS

In order make the terms used in this report more intelligible, two pages of drawings are attached, for purposes of illustration rather than definition, which depict the following.

Figure 1:
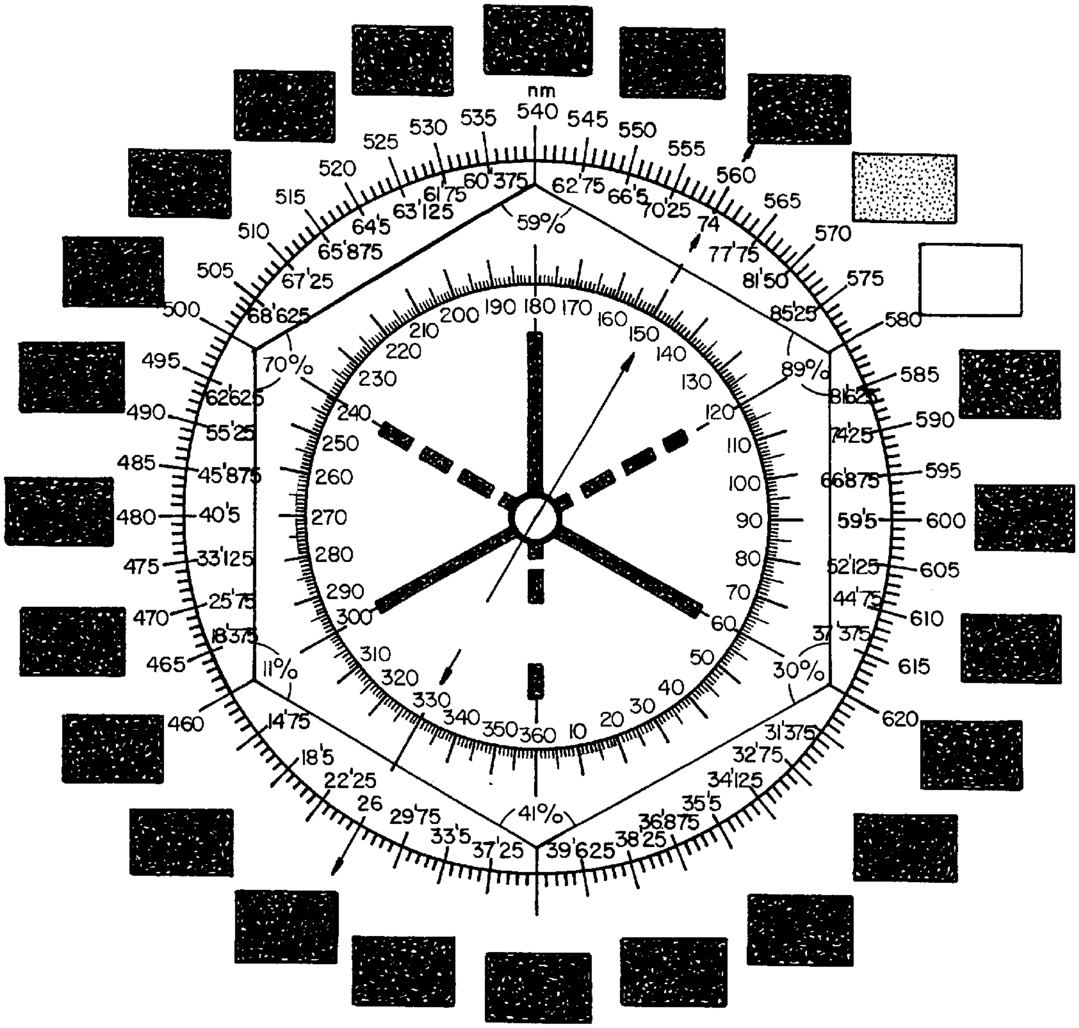
FIG. 1 is a diagram of the method used to develop the invention of a generator for objective nomenclature for colors.
Figure 2:
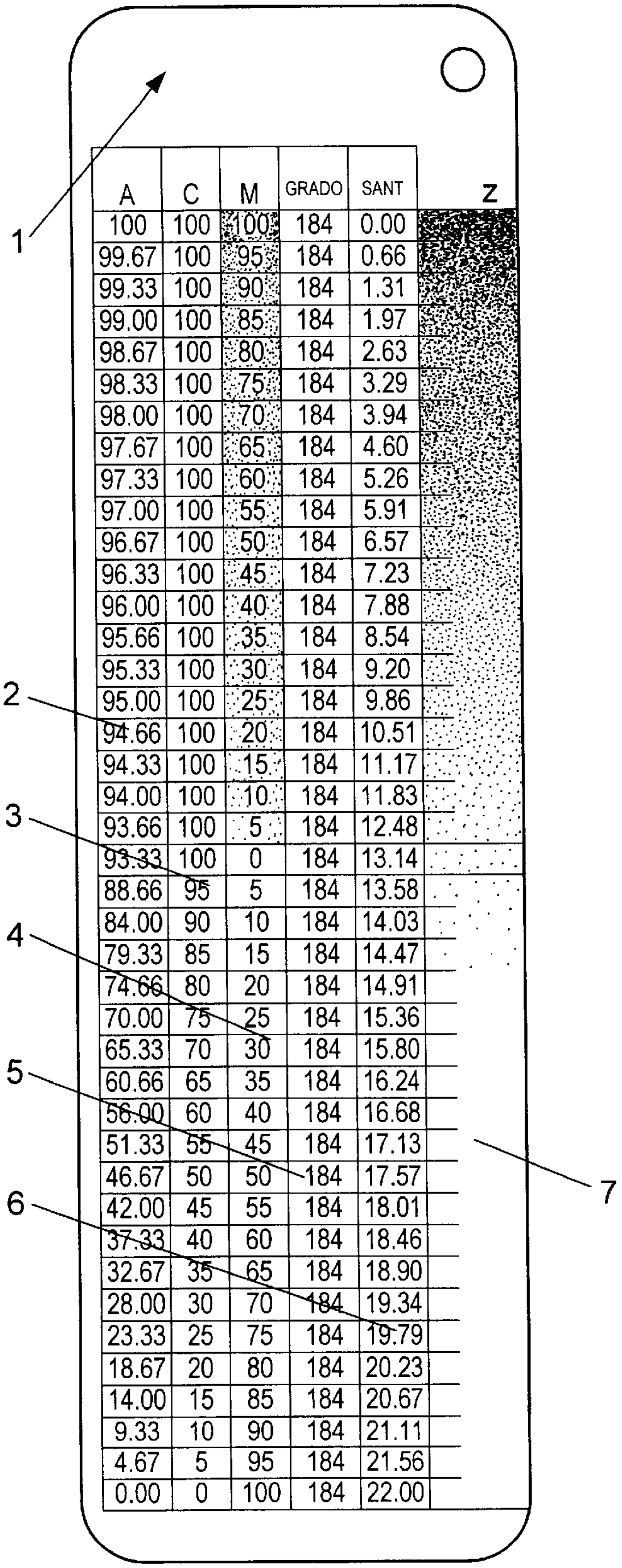
FIG. 2 shows one of the cards.
Figure 3:
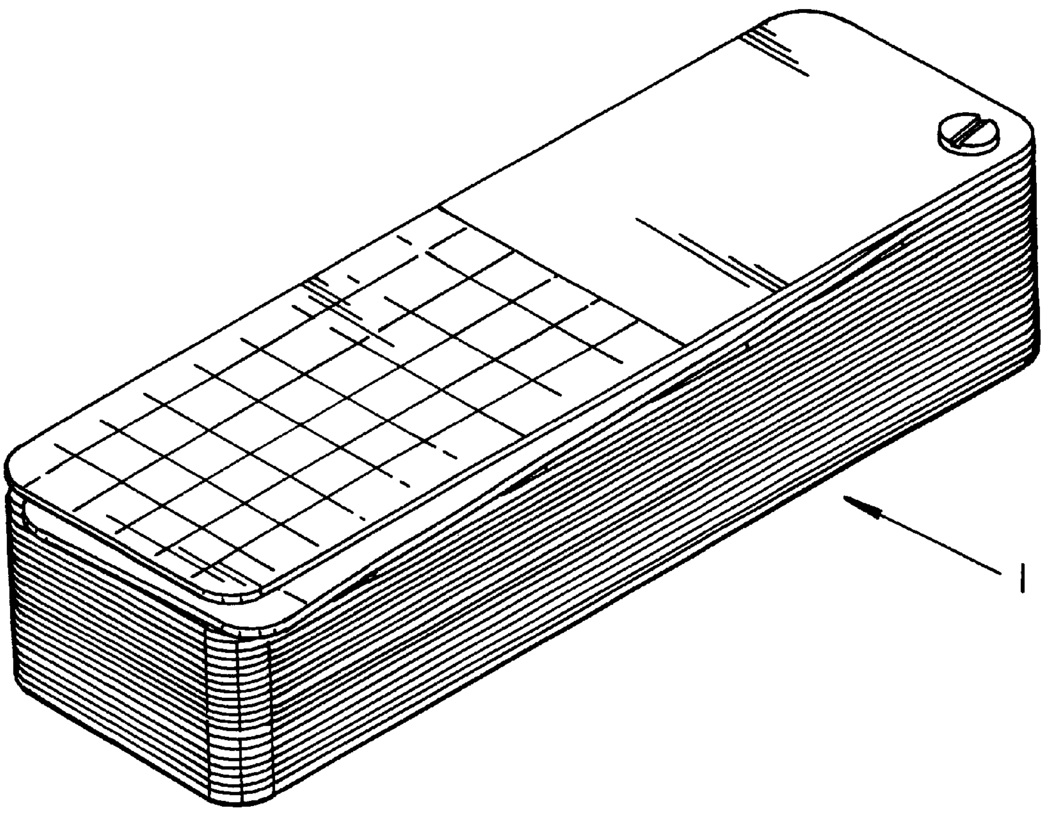
FIG. 3 shows the set of cards held together

The identifying number of the color of each of the tokens is represented by the sum of a certain quantity of two of the three fundamental colors, in such a way that by associating to yellow the number or grade 120, to magenta 0 or 360, and to cyan 60 or grade 240, and assuming they have sexagesimal grades, any color will thus be represented by a number between 0 and 360 grades, the result of the addition of a certain proportion of two of the fundamental colors previously mentioned. by a fastener.

PREFERRED IMPLEMENTATION OF THE INVENTION

It can be seen from the figures that the proposed generator of nomenclature for colors is composed of 361 rectangular cards (1) bearing longitudinal and transverse lines that create a grid upon the surface. Column (2) is tinted with a primary color and on each of the rows, a number ranging from 0 to 100 is printed, indicating the percentage amount of this color found in the final mixture.

Column (3) has the same function as column (2) above, but uses the other primary color of which the mixture is composed.

Column (4) provides the numbers identifying the percentage of complementary and supplementary colors in the mixture.

Column (6) shows the lightness relative to white and the darkness relative to black, defined in the newly created SANT units, ranging from 0 to 22, which results from multiplying the constant of the 0–22 SANT unit by the lightness of the color, with the lightest being represented by the color white, with a value of 100, and the darkest by the color black, with a value of 0.

Column (5) has the identifying number or degree of the color to which each rectangular card (1) belongs, ranging from 0 to 360.

Finally, Column (7) shows the color in a slowly descending tone gradation.

Assembling the 361 rectangular cards (1) with a fastener that goes through the hole (8) located near the upper right edge makes it easier to handle and arrange the rectangular cards of which the invention is composed.

What is claimed is:

1. An objective color nomenclature, comprising a substrate of a flexible material and being associated with a color;

said substrate having a plurality of longitudinal and transverse lines on a surface thereof, said longitudinal and transverse lines arranged to provide a grid on said surface with columns and rows, a first column displaying a range of tones of said color with which the substrate is associated, and a second column displaying a range of tints of a first primary color, which comprises a component of said color associated with said substrate, each row of said second column containing an indicia of the amount of said first primary color incorporated in the corresponding tone of said color associated with said substrate contained in the same row of said first column.

2. The objective color nomenclature generator, according to claim 1, wherein said substrate has a third column displaying a range of tints of a second primary color, which comprises a component of said color associated with said substrate, each row of said third column containing an indicia of the amount of said second primary color incorporated in the corresponding tone of said color associated with said substrate contained in the same row of said first column.

3. The objective color nomenclature generator, according to claim 2, wherein said substrate has a third column, each row of which contains an indicia identifying the percentages of complementary and supplementary colors present in the corresponding tone of said color associated with said substrate contained in the same row of said first column.

4. The objective color nomenclature generator, according to claim 3, wherein said substrate has a fourth column, each row of which contains an indicia of the brightness of the tone of said color associated with said substrate contained in the same row of said first column.

5. The objective color nomenclature generator, according to claim 4, wherein said substrate has a fifth column containing indicia corresponding to a unique identifier of said color associated with said substrate.

6. The objective color nomenclature generator, according to claim 5, wherein said unique color identifier ranges from 0 to 360.

7. An objective color nomenclature generator according to claim 5 comprising a plurality of substrates, a unique color being associated with each substrate, and each color being identified by a unique identifier ranging from 0 to 360.

8. An objective color nomenclature generator, according to claim 7, comprising 361 substrates.

9. The objective color nomenclature generator, according to claim 4, wherein said indicia of brightness ranges from 0 to 100, with 0 corresponding to black and 100 corresponding to white.

10. The objective color nomenclature generator, according to claim 4, wherein said indicia of brightness ranges from 0 to 22 on the SANT scale.

11. The objective color nomenclature generator, according to claim 1, wherein said indicia ranges from 0 to 100.

12. The objective color nomenclature generator, according to claim 11, wherein said indicia indicates a percentage of said primary color.

* * * * *